F. C. MILLER.
LOCK FOR AUTOMOBILE BOXES, &c.
APPLICATION FILED MAR. 20, 1912.
1,053,527.
Patented Feb. 18, 1913.
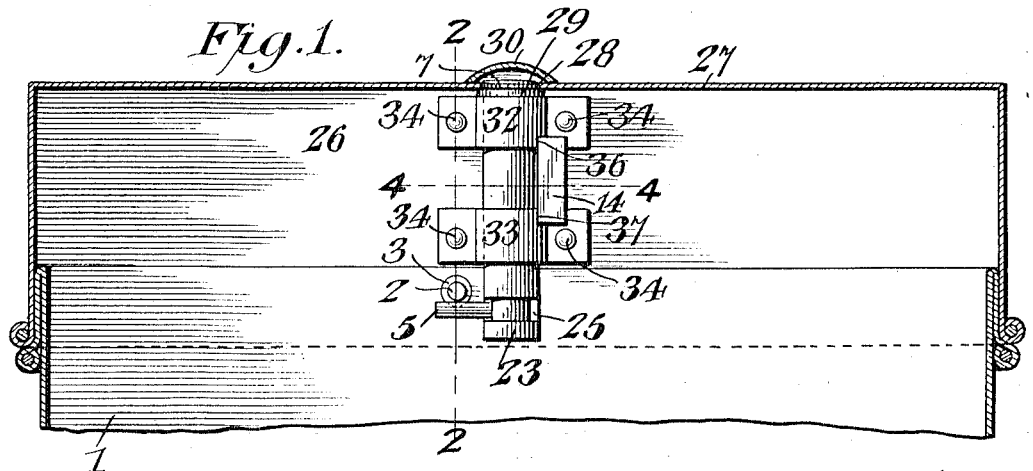
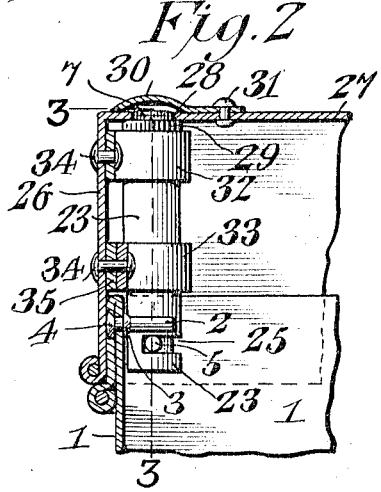
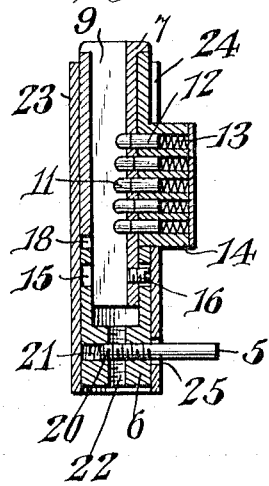
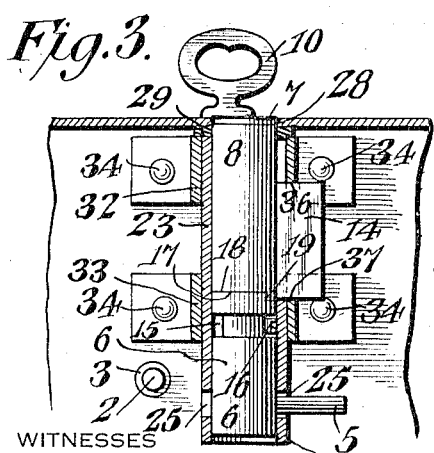
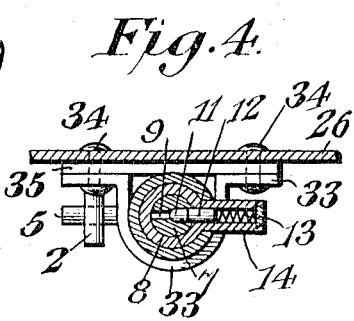
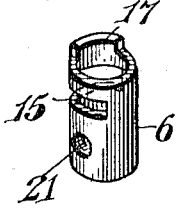
Franklin C. Miller, INVENTOR
WITNESSES
BY
ATTORNEY

UNITED STATES PATENT OFFICE.

FRANKLIN C. MILLER, OF EASTON, PENNSYLVANIA.

LOCK FOR AUTOMOBILE-BOXES, &c.

1,053,527.  Specification of Letters Patent.  Patented Feb. 18, 1913.

Application filed March 20, 1912. Serial No. 685,082.

*To all whom it may concern:*

Be it known that I, FRANKLIN C. MILLER, a citizen of the United States, residing at Easton, in the county of Northampton and State of Pennsylvania, have invented a new and useful Lock for Automobile-Boxes, &c., of which the following is a specification.

The invention relates to a lock for automobile boxes, etc.

The object of the present invention is to improve the construction of box locks, and to provide a simple, strong and efficient lock, designed for use on automobiles and other boxes, trunks, and analogous receptacles, and adapted to securely lock the same, and capable of being released only by its proper key.

A further object of the invention is to provide a box lock of this character, equipped with means for excluding water from the interior of the receptacle and dust and other accumulation from the interior of the lock, so that an automobile box or other receptacle may be left in an exposed position without liability of the lock becoming clogged, or the contents of the receptacle being affected by dust or moisture.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a vertical sectional view of a portion of an automobile box, equipped with a lock, constructed in accordance with this invention. Fig. 2 is a vertical sectional view, taken substantially on the line 2—2 of Fig. 1. Fig. 3 is a vertical sectional view on the line 3—3 of Fig. 2, illustrating the position of the parts when unlocked. Fig. 4 is a horizontal sectional view on the line 4—4 of Fig. 1. Fig. 5 is a longitudinal sectional view of the lock, illustrating the arrangement of the parts when unlocked. Fig. 6 is a detail perspective view of the supporting sleeve. Fig. 7 is a detail perspective view of the tubular bolt.

Like numerals of reference designate corresponding parts in all the figures of the drawing.

In the accompanying drawing in which is illustrated the preferred embodiment of the invention, 1 designates the body of an automobile box provided on its interior with a fixed horizontally projecting pin 2, constituting a keeper and riveted to and extending inwardly from the front of the body 1, as clearly illustrated in Fig. 2 of the drawing. The attached end of the pin 2 pierces the front wall of the body 1, and is provided at the inner face thereof with a shoulder 3 and is headed at its outer end 4 at the outer face of the body of the box. The fixed pin 2 is engaged by an oscillatory locking arm 5, carried by a tubular bolt or sleeve 6, which is rotatably mounted upon the lower end of a vertical cylinder 7. The bolt is rotated by the means hereinafter described to swing the locking arm 5 to a position directly beneath the rigid pin 2 and to carry it from that position to a point beyond the pin and out of engagement with the same.

The vertical cylinder 7, which is rotatably mounted in a cylindrical casing 8, is provided with a key hole or slot 9 for the reception of a key 10 for operating co-acting tumbler pins 11 and 12. The tumbler pins are pressed by springs 13 housed in an offset chamber 14 of the barrel or casing 8. The tumbler pins 11 and 12 and the actuating springs 13 are of the ordinary well known construction, and the cylinder, which extends below the barrel or casing 8, is adapted to make one complete revolution, so that the key can be inserted to operate the lock and removed after the latter is in its locked position. The tubular bolt 6, however, is intended to turn only a sufficient distance to enable it to be thrown into and out of engagement with the fixed pin 2, a movement through an arc of about one hundred and eighty degrees being sufficient. For this purpose, the bolt has an arcuate slot 15 into which extends a stop 16, preferably consisting of a screw secured to the cylinder. The inner end of the tubular bolt 6 is provided with an arcuate projecting portion 17, formed by recessing or cutting away the end of the tubular bolt, and operating in an arcuate recess 18 of the lower end of the barrel or casing, and adapted to engage the opposite walls or shoulders 19 of the said recess, so that the tubular bolt can make only a partial rotation. When the key 10 is inserted in the lock for releasing the cylinder from the locking action of the tumbler pins, the cylinder is adapted to be rotated and during its rotation the stop or projection 16 is carried through the slot 15 until it comes in contact with one of the walls thereof, and by engaging the same rotates the tubular bolt 6 and swings the engaging or locking arm 5 in one direction. A reverse movement of the key will carry the screw or projection through the slot 15 to the other end thereof and will cause the said screw or projection to rotate the tubular bolt a partial revolution in the opposite direction from which it was previously rotated.

The locking or engaging arm 5, which is arranged at right angles to the cylinder and bolt, has a threaded inner portion 20, arranged in a threaded opening 21 extending transversely through the bolt to enable the locking arm to be applied to either side thereof. The bolt is also provided at its lower or outer end with a longitudinal opening 22, interiorly threaded and intersecting the transverse opening 21 to enable a set screw to be employed when desired for engaging the inner portion of the locking arm or member 5 to prevent the latter from accidentally unscrewing.

The lock casing is mounted in an outer supporting sleeve 23, provided with a longitudinal slot 24, extending downwardly from the upper end of the sleeve and adapted to receive the off-set chamber 14. The sleeve is also provided at its lower portion below the longitudinal slot with a transverse slot 25, through which the locking arm projects to permit the necessary swinging movement of the said arm. The supporting sleeve is arranged at the inner face at the front portion 26 of the cover 27, hinged or otherwise connected with the body of the box, and consisting of a horizontal top portion and vertical flanges or portions adapted to fit against the outer faces of the walls of the body of the box. The upper end of the sleeve fits against the lower face of the top of the cover, the lock casing being extended upwardly beyond the upper end of the sleeve and fitting within an opening 28 in the top portion of the cover. The lock is equipped with an elastic washer or gasket 29, arranged on the extended portion of the lock casing and interposed between the upper end of the supporting sleeve and the lower or inner face of the top portion of the cover of the box to provide a water tight joint or connection, which surrounds the opening 28 and prevents the access of water or dust to the interior of the box. The cover is also equipped with a pivoted cap plate 30, secured to the outer face of the top portion of the cover by a rivet 31, or other suitable pivot and movable to and from a position over the opening 28 and adapted to exclude dust, water and other accumulation from the interior of the lock. The pivoted plate is movable to and from a position over the opening 28 to cover the same and also to uncover and expose the key hole or slot to permit the introduction of the key 10 therein.

The supporting sleeve is mounted in upper and lower clips or straps 32 and 33, constructed of suitable metal and curved to fit and embrace the sleeve 23, and provided with extended terminals secured by rivets 34 to the inner face of the front portion of the cover. The rivets of the lower clip or strap also pierces a plate 35, interposed between the lower portion of the sleeve and the front portion of the cover, and spacing the lock from the front portion of the cover a sufficient distance to provide the necessary space for the upper portion of the front wall of the body of the box, as clearly illustrated in Fig. 2 of the drawing. The upper and lower clips are provided with alined recesses 36 and 37, located in the lower edge of the upper clip and in the upper edge of the lower clip, and receiving the upper and lower portions of the projecting off-set chamber 14 of the lock casing. When the lock casing is inserted in the sleeve with the off-set chamber projecting through the longitudinal slot, and the sleeve arranged in the upper and lower clips with the off-set chamber engaging the recesses 36 and 37, the lock casing, the sleeve and the clips are securely interlocked. The lower clip or strap may, if desired, be formed integral with the supporting sleeve.

What is claimed is:—

1. The combination with a receptacle including a body, and a cover, of a fixed keeper projecting from one of the walls of the body, a vertical supporting sleeve secured to the inner face of the cover, a lock casing mounted in the sleeve, a cylinder rotatable in the casing, key released means for controlling the rotary movement of the cylinder, a cylindrical bolt rotatable within the supporting sleeve and connected with the cylinder and provided with a projecting locking arm carried into and out of engagement with the fixed keeper by the rotary movement of the bolt, and a lost motion connection between the bolt and the cylinder to permit the latter to make a complete turn while the bolt is given a partial turn.

2. The combination with a receptacle including a body, and a cover, of a fixed keeper projecting from one of the walls of the body, spaced clips secured to the cover at the inner face thereof and having alined recesses, a lock casing mounted in the clips and having an offset chamber fitting in the said recesses and interlocking the casing with the clips, a rotatable cylinder mounted within the lock casing, and a bolt connected with the cylinder and having a locking arm arranged to engage the fixed keeper.

3. The combination with a receptacle including a body, and a cover, of a fixed keeper projecting from one of the walls of the body, spaced clips secured to the cover at the inner face thereof and having alined recesses, a supporting sleeve secured by the said clips to the cover and provided with a transverse slot and having a longitudinal slot extending inwardly from one end of the sleeve, a lock casing mounted within the supporting sleeve and having an off-set chamber projecting through the longitudinal slot and fitting in the recesses of the clips, a cylinder rotatable in the casing, and a rotary bolt connected with the casing and having a locking arm extending through the transverse slot of the sleeve and carried into and out of engagement with the keeper by the rotary movement of the bolt.

4. The combination with a receptacle including a body, and a cover having an opening, of a fixed keeper projecting from one of the walls of the body portion, a sleeve secured to the cover beneath the said opening, a lock casing mounted on the sleeve and projecting therefrom and fitting in the said opening, a gasket fitted on the projecting portion of the lock casing and interposed between the sleeve and the cover, a cylinder rotatable in the lock casing, and a bolt connected with the cylinder and having a locking arm carried into and out of engagement with the keeper by the rotary movement of the cylinder.

5. The combination with a box including a body, and a cover having a top portion and provided with vertical flanges to fit the exterior of the body, of a horizontal pin projecting from the inner face of one of the walls of the body, upper and lower clips secured to the inner face of one of the vertical flanges of the cover, a vertical supporting sleeve mounted in the clips, a lock casing arranged within the sleeve, a cylinder rotatable in the lock casing and extending below the same, a tubular sleeve fitted on the extended portion of the cylinder and arranged within the lower portion of the sleeve, key released means for controlling the rotary movement of the cylinder, a lost motion connection between the bolt and the cylinder to permit the latter to make a complete turn while the bolt is given a partial turn, and a locking arm projecting from the bolt and carried into and out of engagement with the pin by the rotary movement of the said bolt.

In testimony, that I claim the foregoing as my own, I have hereto affixed my signature in the presence of two witnesses.

FRANKLIN C. MILLER.

Witnesses:
S. S. HORN,
RUSSELL D. WELCH.